United States Patent [19]
Murata et al.

[11] Patent Number: 5,730,632
[45] Date of Patent: Mar. 24, 1998

[54] OUTBOARD MOTOR

[75] Inventors: Hiroyuki Murata; Hiroshi Kawamura, both of Wako, Japan

[73] Assignee: Honda Giken Kogyo Kabushiki Kaisha, Tokyo, Japan

[21] Appl. No.: 648,982

[22] Filed: May 17, 1996

[30] Foreign Application Priority Data

May 17, 1995 [JP] Japan ................... 7-118786

[51] Int. Cl.$^6$ ................... B63H 21/12
[52] U.S. Cl. ................... 440/88; 60/299; 60/302; 60/317
[58] Field of Search ................... 440/88, 89; 60/299, 60/302, 304, 317, 306; 123/196 R, 196 W

[56] References Cited

U.S. PATENT DOCUMENTS

| | | | |
|---|---|---|---|
| 2,024,193 | 12/1935 | Watkins | 416/39 |
| 3,195,521 | 7/1965 | Larsen | 440/89 |
| 4,583,953 | 4/1986 | Nakase | 440/52 |
| 4,983,135 | 1/1991 | Boda et al. | 440/88 |
| 5,174,112 | 12/1992 | Sougawa et al. | 440/89 |
| 5,408,829 | 4/1995 | Woodward | 60/304 |
| 5,439,404 | 8/1995 | Sumigawa | 440/88 |
| 5,501,621 | 3/1996 | Shigedomi et al. | 440/88 |
| 5,554,060 | 9/1996 | Koishikawa et al. | 440/88 |

FOREIGN PATENT DOCUMENTS

| | | |
|---|---|---|
| 56-44638 | 5/1975 | Japan. |
| 55-6186 | 3/1978 | Japan. |
| 55-10043 (A) | 1/1980 | Japan. |
| 3-23308 (A) | 1/1991 | Japan. |
| 07215294 A | 8/1995 | Japan. |

*Primary Examiner*—Sherman Basinger
*Attorney, Agent, or Firm*—Merchant, Gould, Smith, Edell, Welter & Schmidt, P.A.

[57] ABSTRACT

An outboard motor includes an exhaust emission control system which is arranged rationally and neatly in the housing of an outboard motor body, irrespective of various limitations on the outside shape of the housing. An oil pan disposed below an engine of the outboard motor has an oil holding portion, and an exhaust pipe is disposed vertically along a vertical wall portion of the oil holding portion. A catalytic converter is disposed in an intermediate portion of the exhaust pipe in confronted relation to the vertical wall portion. The catalytic converter has a particular shape in horizontal section which is greater in size in a first direction than in a second direction perpendicular to the first direction. A fresh-air delivery passage is provided for introducing fresh air into an exhaust passage disposed upstream of the exhaust pipe. The fresh-air delivery passage is connected at one end to the top plate of an intake box and includes a check valve disposed at an intermediate portion of the fresh-air passage. The check valve is adapted to open only when the pressure in the exhaust passage is less than the atmospheric pressure. The exhaust system is perfectly protected against a possible entry of water and an engine combustion failure and corrosion of the exhaust system resulting therefrom.

25 Claims, 10 Drawing Sheets

FIG. I

OUTBOARD MOTOR

BACKGROUND OF THE INVENTION

1. Field of the Invention

The present invention relates generally to outboard motors equipped with an exhaust emission control device, and more particularly to an outboard motor so constructed as to enable a catalytic converter constituting the exhaust emission control device to be arranged neatly in the internal space of a housing, without affecting the arrangement of peripheral components, irrespective of strict limitations on the outside size of the housing. The invention also relates to an outboard motor equipped with an exhaust gas purification system including a fresh-air delivery passage provided to enhance the exhaust purifying effect of the catalytic converter.

2. Description of the Prior Art

Outboard motors of the type including an exhaust emission control device utilizing catalysts are disclosed, for example, in Japanese Utility Model Laid-Open Publication No. SHO 55-6186 and Japanese Patent Laid-Open Publication No. SHO 55-10043.

A similar technique of using catalysts in a four-stroke engine of the outboard motor is disclosed in Japanese Patent Laid-Open Publication HEI 3-23308. The disclosed outboard motor includes an oil sump provided in front of the engine body for lubricating the engine. The lubrication oil is supplied by a scavenging pump into the oil sump, and so the engine of this type is called a "dry-sump" type engine. The sump and an exhaust system disposed in a casing or housing of the outboard motor and including an exhaust pipe and catalysts held therein are arranged with no consideration given to the relationship between the sump and the exhaust system.

The same is true of the outboard motors disclosed in the aforesaid Japanese Utility Model Laid-Open Publication No. SHO 55-6186 and Japanese Patent Laid-Open Publication No. SHO 55-10043.

The outboard motors having a four-stroke engine which are currently placed on the market are of the so-called "wet-sump" type in which a sump or oil pan is disposed substantially beneath the engine body. In this type of engine, the exhaust gas leaving the engine is guided downward in the case or housing of an outboard motor body and subsequently discharged from an exhaust opening formed in the housing. According to this arrangement, installation of an exhaust emission control device in an exhaust system is almost impossible to achieve unless an appropriate consideration is given to the relationship between the oil pan and the exhaust system.

More particularly, since the engine, various functional components associated with the engine, and a driving or propelling mechanism are all received in the housing, the intention of maintaining the necessary space in the housing for installation of the oil holding portion of the oil pan and the intention of maintaining the necessary space in the housing for installation of catalysts constituting the exhaust emission control device can hardly stand together.

The outboard motor body including the housing is rotatably supported on a vertical steering shaft by means of a pair of mount members disposed close to upper and lower ends, respectively, of the steering shaft. The mount members (forming a support structure) is usually composed of a pair of laterally spaced horizontal arms or frames extending rearward from the steering shaft. In order to accommodate vibrations generated during the operation of the engine, the position of the arms or frames should preferably be close to a torque roll axis. To deal with this requirement, the housing of the outboard motor body is constricted at portions adjacent to the mount arms or frames. Due to the presence of the constricted portions, the housing can hardly solve the underlying problem concerning the necessary space for installation of the catalysts.

Furthermore, a lower part of the outboard motor adapted to be submerged in the water is narrowed or confined in the widthwise direction to lower the underwater resistance. The narrowed lower part poses an additional limitation on the overall size of the housing.

In practice, the exhaust emission control device is composed of a catalytic converter disposed in an intermediate portion of the exhaust pipe. In this regard, it is further preferable that means for supplying fresh air to the catalytic converter is provided for the purpose of removing uncombusted components such as HC and other components such as CO from the exhaust gas before it is exhausted from the outboard motor. In order to realize the fresh-air supplying means, an appropriate consideration should be given to the manner of providing a fresh-air delivery passage with highly efficient use of the constricted internal space of the housing, and the manner of interconnecting the fresh-air delivery passage and an exhaust passage in the exhaust system with a view to improving or enhancing the exhaust emission controlling effect (exhaust gas purifying effect) of the catalytic converter.

Under these circumstances, study and investigations made by the present inventors have been concentrated on the way or manner of rationally arranging, within an internal space of the restricted lower part of the housing, an oil pan having a desired capacity together with an exhaust system including a catalytic converter, irrespective of the dimensional and spatial limitations on the outside shape of the housing.

On the other hand, the outboard motor may form a high negative pressure or vacuum in the exhaust system when the engine is started or in response to pulsation of the exhaust gas flow. The thus formed vacuum is disadvantageous because water may be drawn into the exhaust system by the action of negative pressure. In this regard, according to the construction of the outboard motor disclosed in Japanese Utility Model Publication No. SHO 56-44638, the engine cooling water and the exhaust gas are discharged into the water through an opening in the housing, as clearly shown in FIG. 1 of the same publication. The engine has a block body in which an air supply passage and a check valve are provided such that when a negative pressure or vacuum is formed in the exhaust system, fresh air is supplied in the exhaust system to cancel out the negative pressure, thereby preventing water from flowing back into the exhaust system.

Another outboard motor disclosed in U.S. Pat. No. 2,024,193 includes a bimetallic valve disposed in the expansion chamber. At the start of the engine, the temperature of the engine is low and substantially equal to the atmospheric temperature, and so the bimetallic valve is open and thereby precludes formation of a negative pressure in the exhaust system. The bimetallic valve is closed when subjected to high temperatures. The outboard motor having such bimetallic valve can prevent formation of a negative pressure only when the engine is started. Since the valve opening and closing operation of the bimetallic valve depends on the engine temperature, the outboard motor disclosed in U.S. Pat. No. 2,024,193 cannot deal with a negative pressure or vacuum formed in response to pulsation of the exhaust gas flow.

The check valve of the outboard motor disclosed in the aforesaid Japanese Utility Model Publication No. SHO 56-44638 is constructed to perform the prescribed valve opening and closing operation depending on the pressure and accordingly the check valve can deal with pulsation of the exhaust gas flow. However, since the check valve is attached directly to an exhaust passage, as shown in FIG. 2 of the same publication, the check valve is susceptible to thermal deformation under the effect of heat emitted from the exhaust gas. The engine and the check valve are enclosed in an engine cover. However, since the engine cover has an intake port without exception (though not illustrated in the drawings of the same Japanese publication), the engine cover unavoidably accepts water droplets to some extent through the intake port. Particularly when the outboard motor is used in bad weather incorporating a heavy rain and a high wave, the amount of water flowing into the outboard motor is remarkable. In this instance, if the water is sea water containing salt, a fine passage in a component is likely to catch the sea water and eventually become closed by salt deposited therein. In addition, the stem of a valve body, the valve body as a whole, and the valve box are likely to be stained or corroded by salt according to the material used. Even if the amount is very small, the water penetrating into the engine cover is objectionable because part of the water can be drawn into the exhaust passage directly through the check valve. The major part of the water is collected at the bottom of the engine cover.

SUMMARY OF THE INVENTION

With the foregoing difficulties in view, a first object of the present invention is to provide an outboard motor which is capable of neatly and rationally arranging, within the internal space in a constricted lower portion of the housing, an oil pan having a sufficient capacity together with an exhaust system including a catalytic converter of a sufficient size and capacity, without affecting the arrangement of peripheral components, even though the housing has various spatial and dimensional limitations on its outside shape.

A second object of the present invention is to provide an outboard motor which is equipped with an exhaust emission control device including a catalytic converter, and a fresh-air delivery system rationally and properly related to the exhaust emission control device in such a manner as to improve the exhaust emission controlling effect of the exhaust emission control device.

A third object of the present invention is to provide an outboard motor which is capable of accommodating or canceling out a negative pressure or vacuum formed in the exhaust system when the engine is started or in response to pulsation of the exhaust gas flow, and which is able to supply dry air into the exhaust system even when penetration of water into the engine cover is unavoidable to some extent.

According to a first aspect Of the present invention, there is provided an outboard motor which includes an oil pan having an oil holding portion, an exhaust pipe disposed vertically along a vertically extending wall portion of the oil holding portion, and a catalytic converter disposed in the exhaust pipe at an intermediate portion thereof. The catalytic converter is confronted with the wall portion of the oil holding portion with a space provided therebetween. The catalytic converter has a particular shape in horizontal cross section configured such that the size of the horizontal cross-sectional shape is greater in a first direction than in a second direction perpendicular to the first direction.

The horizontal cross-sectional shape of the catalytic converter is oblong, and by virtue of this oblong cross-sectional shape, the catalytic converter can possess a greater capacity than the catalytic converter having a circular section and can be arranged neatly in a constrained lower portion of the housing without interference with peripheral components even when the catalytic converter is disposed in juxtaposition of the wall portion of the oil holding portion.

The oil holding portion preferably has a recessed portion having a generally L-shaped configuration as viewed from the bottom, and the catalytic converter is disposed in the L-shaped recessed portion. The L-shaped recessed portion is defined by a first wall part of the oil holding portion extending substantially parallel to the first direction, and a second wall part of the oil holding portion extending substantially parallel to the second direction, the first wall part being greater in size than the second wall part. The L-shaped recessed portion receiving therein the catalytic converter makes it possible to increase the size and capacity of the catalytic converter without posing any restriction to the volume or capacity of the oil pan.

The catalytic converter is disposed on one side of the oil pan, and the horizontal cross-sectional shape of the catalytic converter is greater in size in the longitudinal direction of the outboard motor than in the widthwise direction of the same. The catalytic converter thus arranged has an enlarged capacity but is still able to meet the limitations on the outside shape of the housing which are set strict in the widthwise direction as compared to the limitations in the longitudinal direction. The shape in horizontal cross section of the catalytic converter may be elliptic or oblong which is similar in shape to a running track having two parallel spaced straight sides along its major axis.

An outboard motor according to a second aspect of the present invention is substantially the same in construction as the outboard motor of the first aspect with the exception that a fresh-air delivery system is provided for introducing fresh air into the exhaust pipe. The outboard motor equipped with the fresh-air delivery system is able to enhance the exhaust emission controlling effect (exhaust gas purifying effect) of the catalytic converter while retaining the same functions and effects as the outboard motor of the first aspect of the invention.

The fresh-air delivery system has an intake opening, and this intake opening is preferably composed of an intake silencer which is disposed upstream of a fuel supply unit of the engine. Since the fresh air to be supplied to the catalytic converter is introduced from the intake silencer used primarily for generating a fuel-and-air mixture in the fuel supply line, the intake noise level can be considerably attenuated by the intake silencer.

In one preferred form the fresh-air delivery system is composed of a first conduit connected at one end to the intake silencer, a check valve having an inlet side connected to the other end of the first conduit and also having an outlet side, a second conduit connected at one end to the outlet side of the check valve and, at the other end, to an exhaust passage held in fluid communication with the exhaust pipe. By virtue of the check valve, the fresh air is supplied stably and reliably into the exhaust passage when the occasion arises.

The check valve is disposed on a mount case on which the engine is supported. The check-valve supporting structure is extremely simple and requires no separate supporting means. Since the mount case has an air passage or duct firmly retaining therein an end of the conduit of the fresh-air delivery system, the fresh-air delivery system as a whole can be retained stably and reliably within the housing including an engine cover.

An outboard motor provided in accordance with a third aspect of the present invention includes a fresh-air delivery passage connected at one end to an exhaust passage or duct and, at the other end, to an intake box disposed upstream of an intake duct of the engine. A check valve is disposed in an intermediate portion of the fresh-air delivery passage and adapted to be open only when the pressure in the exhaust duct is less than the atmospheric pressure. At least a part of a longitudinal portion of the fresh-air delivery passage extending between the check valve and the exhaust duct has a thermally insulated structure. The thermally insulated structure is preferably composed of a heat-insulating tube, such as a tube of heat-insulating rubber. By the use of the heat-insulating tube, transmission of heat from the exhaust duct to the check valve is blocked and does not take place.

It is also preferable that at least a part of the fresh-air delivery passage has a cooled structure, and that the cooled structure is composed of a metal tube.

The fresh-air delivery passage may be connected to any side of the intake box except the underside. Among others, the top plate of the intake box is most desirable because this arrangement is highly resistant to a possible entry of water in the fresh-air delivery passage.

In another preferred form of this invention, the outboard motor has an exhaust expansion chamber defined in a body of the outboard motor, and an exhaust pipe disposed in the exhaust expansion chamber and having a lower open end from which the exhaust gases are discharged. The outboard motor further has a cooling water passage for cooling an engine of the outboard motor. Since an outlet of the cooling water passage is opening to the exhaust expansion chamber at a position higher than the position of the lower open end of the exhaust pipe, the engine cooling water once engaged in the engine cooling operation can never flow back into the exhaust pipe.

The above and other objects, features and advantages of the present invention will become manifest to those versed in the art upon making reference to the detailed description and accompanying sheets of drawings in which a preferred structural embodiment incorporating the principles of the present invention is shown by way of illustrative example.

DETAILED DESCRIPTION OF THE INVENTION

A preferred structural embodiment of the present invention will be described below in greater detail with reference to the accompanying sheets of drawings.

Figure 1:
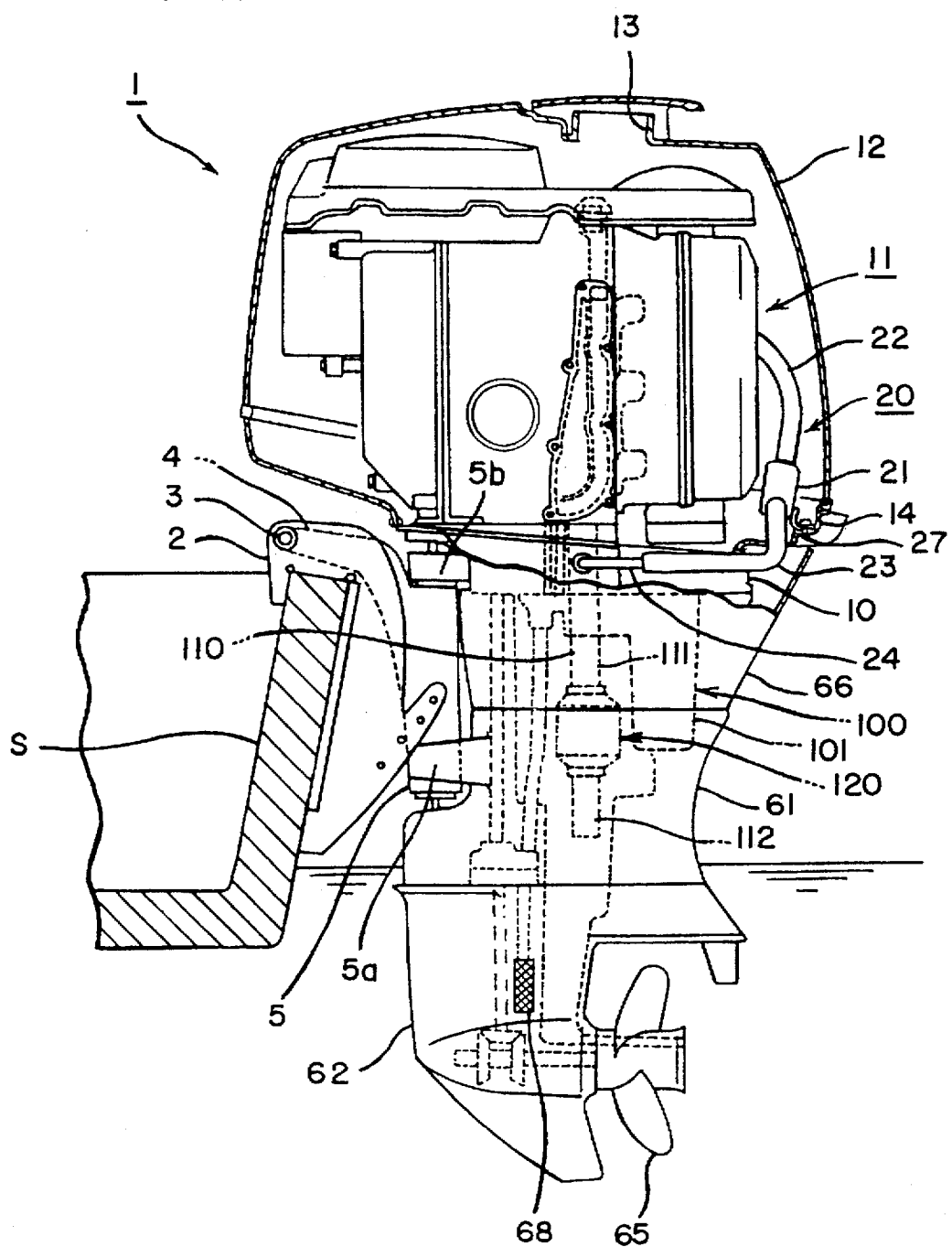
FIG. 1 is a side view, with parts broken away for clarity, of an outboard motor according to an embodiment of the present invention, showing in cross section also the stern of a hull to which the outboard motor is attached.

As shown in FIG. 1, an outboard engine or motor 1 according to the present invention includes a swivel case 4 pivotally connected by a horizontal tilt shaft 3 to a stern bracket 2 attached to a stern S of a hull. Thus, the outboard motor 1 is attached to the stern S such that it can tilt up and down about the tilt shaft 3. The outboard motor 1 is also able to swing in the lateral direction about a vertical swivel shaft 5 supported in the swivel case 4.

The outboard motor 1 further includes an engine 11 supported on a mount case 10 at a position above the swivel shaft 5. The engine 11 in the illustrated embodiment is composed of a multicylinder four-stroke water-cooled engine with cylinders disposed horizontally and a crankshaft disposed vertically. The engine 11 is covered or closed by an engine cover 12 and an under case 14. The engine cover 12 has an intake port 13 at an upper portion thereof.

The engine cover 12 and the engine case 14 jointly define therebetween an internal space in which a fresh-air delivery conduit assembly or system 20 is disposed together with the engine 11. The fresh-air delivery system 20 constitutes a secondary air supply device or unit for supplying fresh air to an upstream side of a catalytic converter 120 of an exhaust system. The catalytic converter 120 constitutes an exhaust emission control device that purifies exhaust gas before it is discharged from the outboard motor 1 while the engine 11 is running.

Figure 2:
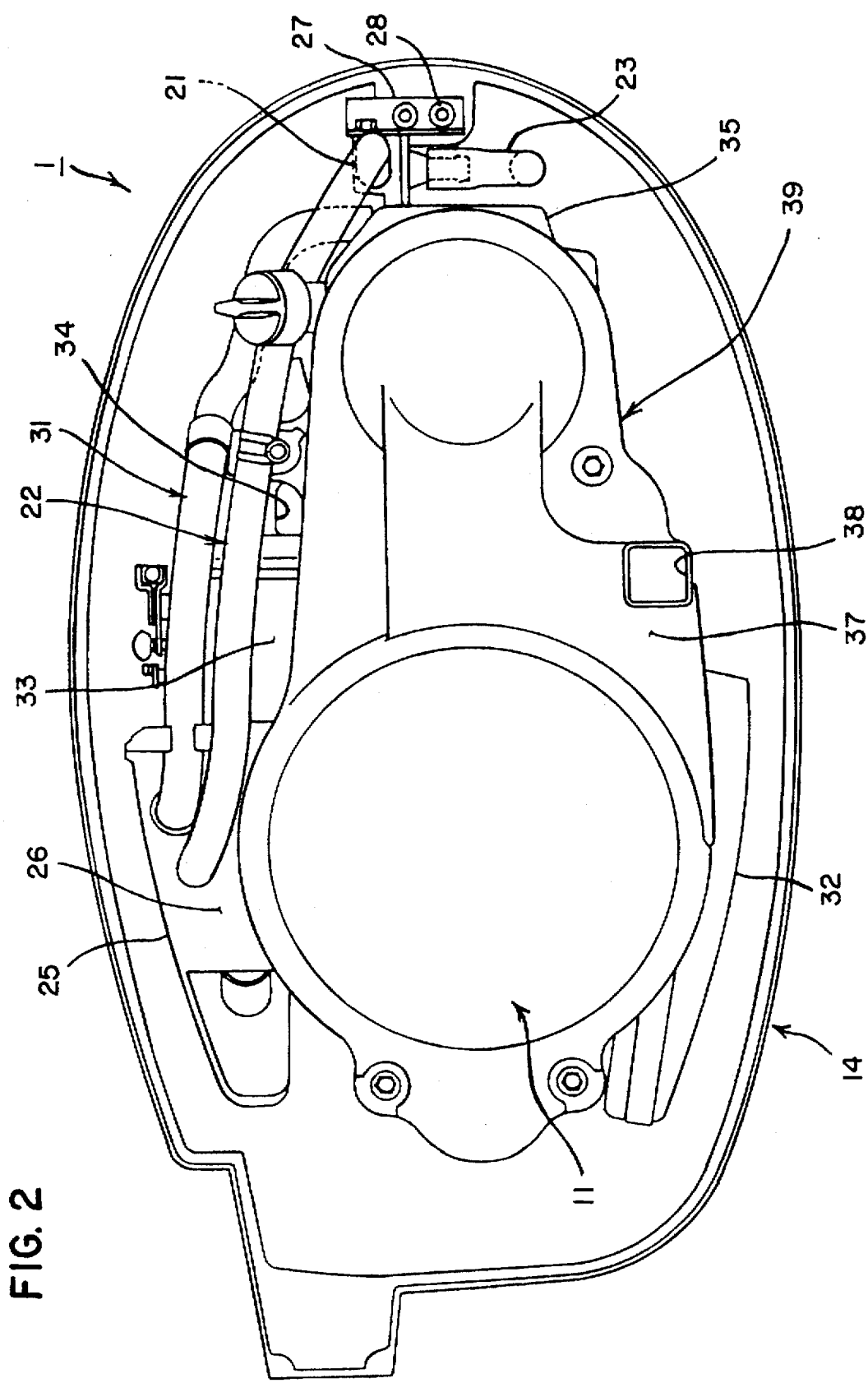
FIG. 2 is a plan view of the outboard motor shown with an engine cover removed.
Figure 3:
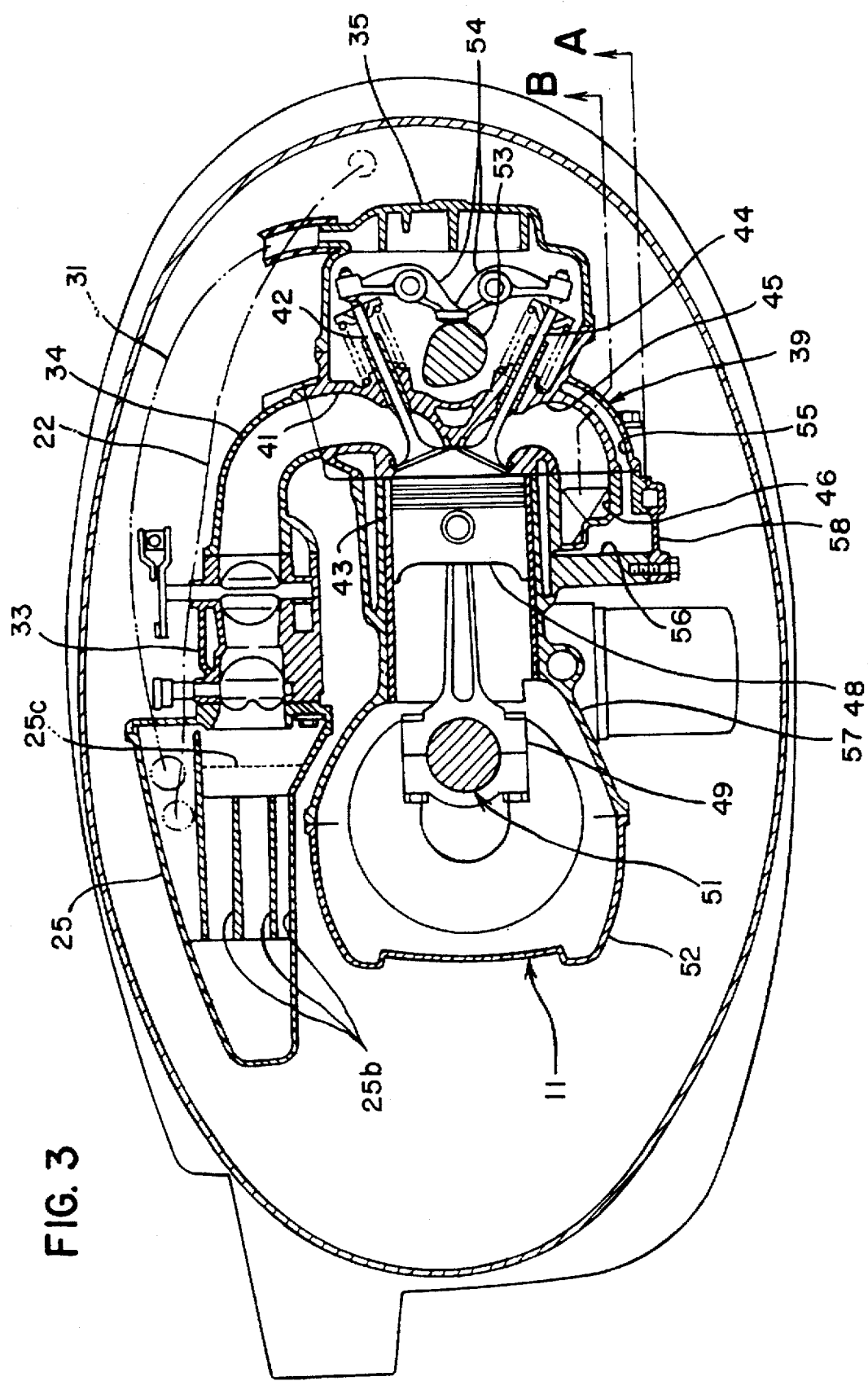
FIG. 3 is a transverse cross-sectional view of the outboard motor.

In FIGS. 2 and 3, an electric equipment box 32 (FIG. 2) is shown as being attached on one side (right-hand side in FIG. 2) of the engine 11, and an intake silencer 25 on the other side (left-hand side in FIGS. 2 and 3) of the engine 11. Carburetors 33 each provided for one cylinder of the engine 11 are connected with an intake manifold 34 attached to a cylinder head 39 of the engine 11. A combustible fuel-and-air mixture formed in each carburetor 33 is introduced into a corresponding combustion chamber 43 (FIG. 3) of the engine 11 via an intake passage or duct 41.

The intake silencer 25 has a top plate 26 (FIG. 2) from which a breezer tube 31 and a primary tube 22 of the fresh-air delivery system 20 extend in parallel juxtaposed relation to each other along the other side (left-hand side in FIG. 2) of the engine 11. The breezer tube 31 is then connected to a cylinder head cover 35 of the engine 11 so as to form or complete a blow-by gas recovery system. The primary tube 22 is connected to a check valve 21. In FIG. 2 reference character 37 denotes a belt cover, and 38 a ventilating opening formed in the belt cover 37.

The intake silencer 25, the carburetor 33, the intake manifold 34, the intake duct 41 in the cylinder head 39, and an intake valve 42 (FIG. 3) jointly form an intake system of the engine 11. On the other hand, an exhaust system of the engine 11 is formed jointly by an exhaust valve 44, an exhaust passage or duct 45, and an exhaust manifold 46 disposed vertically.

In FIG. 3 reference character 48 denotes a piston disposed horizontally to undertake reciprocating movement along an axis of the corresponding cylinder, 49 a connecting rod, 51 a crankshaft disposed vertically, 52 a crankcase, 53 a camshaft, 54 a valve rocker arm, 55 and 56 cooling-water passages or ducts, and 58 a cooling-water passage cover.

As previously described, the cylinder block 57 and the piston 48 are disposed horizontally, and the crankshaft 51 is disposed vertically so that in FIG. 3, the crankshaft 51 extends in a direction perpendicular to the sheet of the same drawing figure.

The intake silencer 25 has formed therein a plurality of sound deadening passages 25b and is provided with a mesh screen 25c.

Figure 4:
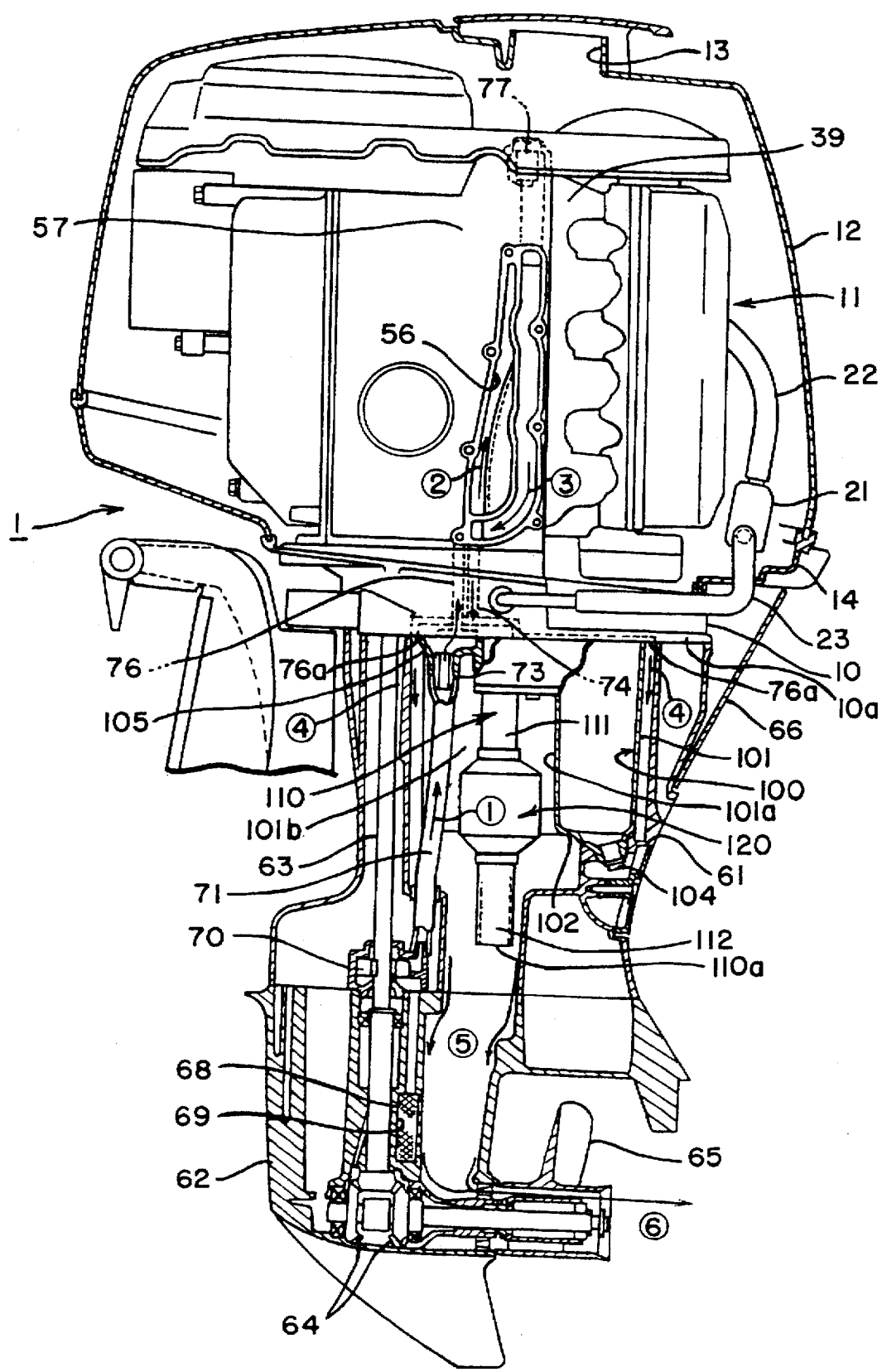
FIG. 4 is a longitudinal cross-sectional view taken in the direction of the arrow A of FIG. 3.

As shown in FIG. 4, an extension case 61 is attached to a lower end of the mount case 10, and a gear case 62 is attached to a lower end of the extension case 61.

A vertical shaft 63 extends vertically through an internal space of the extension case 61 and is coupled with a propeller 65 via bevel gears 64, 64. The vertical shaft 63 is driven by the crankshaft 51 (FIG. 3) to rotate the propeller 65 via the bevel gears 64.

The extension case 61 has an upper portion covered with an under cover 66 so that a secondary tube 23 of the fresh-air delivery system 20 cannot be observed from the outside. The engine case 12, the under case 14, the under cover 66, the extension case 61, and the gear case 62 jointly form a housing.

Referring now to FIG. 4, a cooling-water supply system of the outboard motor 1 will be described below.

Cooling water is pumped up from a cooling-water intake opening 69 by means of a water pump 70, the intake opening 69 being provided with a screen 68. Then the cooling water passes successively through a water delivery pipe or conduit 71 (as indicated by the arrow ①), through a water delivery passage or duct 73 in a mount seat 105 disposed in front of (on the left-hand side in FIG. 4) the oil pan 100, and through a water delivery passage or duct 76 in the mount case 10 and subsequently enters the cooling-water duct 56 in the engine 11 (as indicated by the arrow ②), thereby cooling down desired portions of the cylinder block 57 and cylinder head 39.

Thereafter, the cooling water flows down from a drain passage or duct 74 into the extension case 61 as indicated by the arrow ③. More specifically, the cooling water first flows horizontally over the upper surface of a gasket 10a attached to the under surface of the mount case 10 and then falls by gravity down into the extension case 61 through a plurality of openings 76a, 76a formed in the gasket 10a, as indicated by the arrows ④ and ④.

The cooling water used for cooling the engine 11 is further engaged in the cooling operation taken with respect to the oil pan 100 and subsequently discharged from the outboard motor 1, as indicated by the arrows ⑤ and ⑥.

The cooling-water supply system includes a thermostat 77 so that a path of the cooling water can be changed according to the cooling water temperature or the engine temperature. A further description of this arrangement will be omitted.

Figure 5:
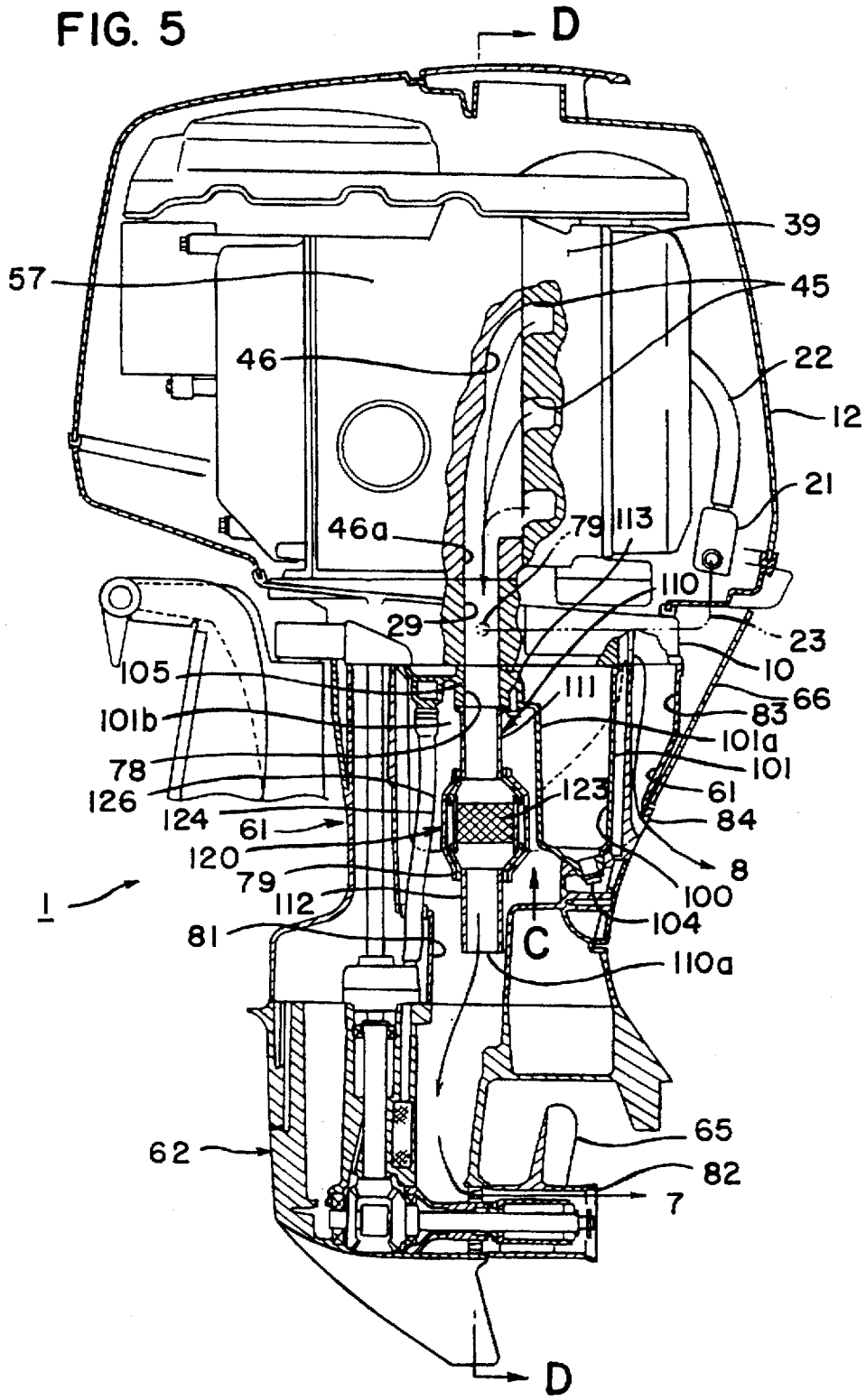
FIG. 5 is a longitudinal cross-sectional view taken in the direction of the arrow B of FIG. 3.

FIG. 5 is a longitudinal cross-sectional view of the outboard motor 1 taken in the direction of the arrow B in FIG. 3 and will be used for the purpose of describing an exhaust system of the outboard motor 1. Streams of exhaust gases discharged from the respective discharge ducts 45 in the cylinder head 39 flow down through the exhaust manifold 46 as indicated by the arrow and then they are blended together at a confluent portion 46a in the exhaust manifold 46. Thereafter, the exhaust gas passes Successively through the exhaust passage or duct 29 in the mount case, and through an exhaust passage or duct 78 in the mount seat 105, and subsequently enters an exhaust pipe 110 from which the exhaust gas is discharged into an exhaust expansion chamber 81 defined in the extension case 61. The exhaust pipe 110 is bolted to, and extends downward from, the under surface of an oil holding portion 101 of the oil pan 100. The exhaust pipe 110 is made of stainless steel or aluminum alloy.

The exhaust pipe 110 has a lower end opening 110a located within the exhaust expansion chamber 81 of the extension case 61. The greater part of the exhaust gas emitted from the lower end opening 110a moves along a path indicated by the arrows ⑦ and is finally discharged from a main exhaust port 82 to the outside of the outboard motor 1. However, a part of the exhaust gas takes a course indicated by the arrow ⑧, passing through an auxiliary exhaust passage or duct 83 and then leaving the outboard motor 1 from an auxiliary exhaust port 84.

As previously mentioned with reference to FIG. 1, a body of the outboard motor 1 is attached to the stern S of the hull or vessel by means of the mount case 10 for the engine 11, the stern bracket 2, the swivel case 4 pivotally connected by the tilt shaft 3 to the stern bracket 2, and the swivel shaft 5 in the swivel case 4. These parts 10, 2, 4, 3 and 5 serve as a support frame or arm for attaching the outboard motor body to the hull. It is preferable that a support mechanism used for supporting the outboard motor body is disposed around a torque roll axis in order to accommodate or take up vibrations generated while the engine 11 is running. To deal with this requirement, the support mechanism should preferably be composed of a lower mount 5a and an upper mount 5b disposed at lower and upper ends, respectively, of the swivel shaft 5 and having a bifurcated or branched frame-like configuration. Due to the peculiarity of the bifurcated configuration, the branched frame-like mounts 5a, 5b are necessarily narrowed at a portion adjacent to the junction of a Y.

The outboard motor body including the extension case 61 is narrowed at its lower mount 5a side, and the configuration of the narrowed part necessarily have influence on the shape and configuration of walls or other components disposed behind the narrowed part of the outboard motor body. The outboard motor body has a maximum width at a position adjacent to the upper mount 5b located immediately below the engine room, so that the exhaust ducts are formed in the engine block or in the proximity of the oil pan 100 disposed substantially beneath the engine block.

The oil pan 100 is so configured as shown in FIGS. 1 and 4 through 7.

The oil pan 100 is provided on a lower part of the engine 11 and includes an oil holding portion or reservoir 101 substantially constituting a reservoir in which a lubricating oil is collected and stored. The oil holding portion 101, as shown in the bottom view of FIG. 6, includes a recessed portion 103 having a first side wall 101a extending substantially in the longitudinal direction of the outboard motor body, and a second side wall 101b extending substantially in the transverse direction of the outboard motor body. As a result of formation of the recessed portion 103, the oil holding portion 101 has a generally L-shaped configuration as viewed from the bottom. As understood from FIG. 6, the dimensions or size of the oil holding portion 101 is greater in the longitudinal direction than in the transverse direction in like manner as a substantially oval configuration of the under cover 66. The recessed portion 103 may have a curved profile. The cooling-water delivery duct 73, as shown in FIG. 6, is located diagonally to the forward right (lower left in FIG. 6) of the longitudinal side wall 101a of the recessed portion 103.

Figure 6:
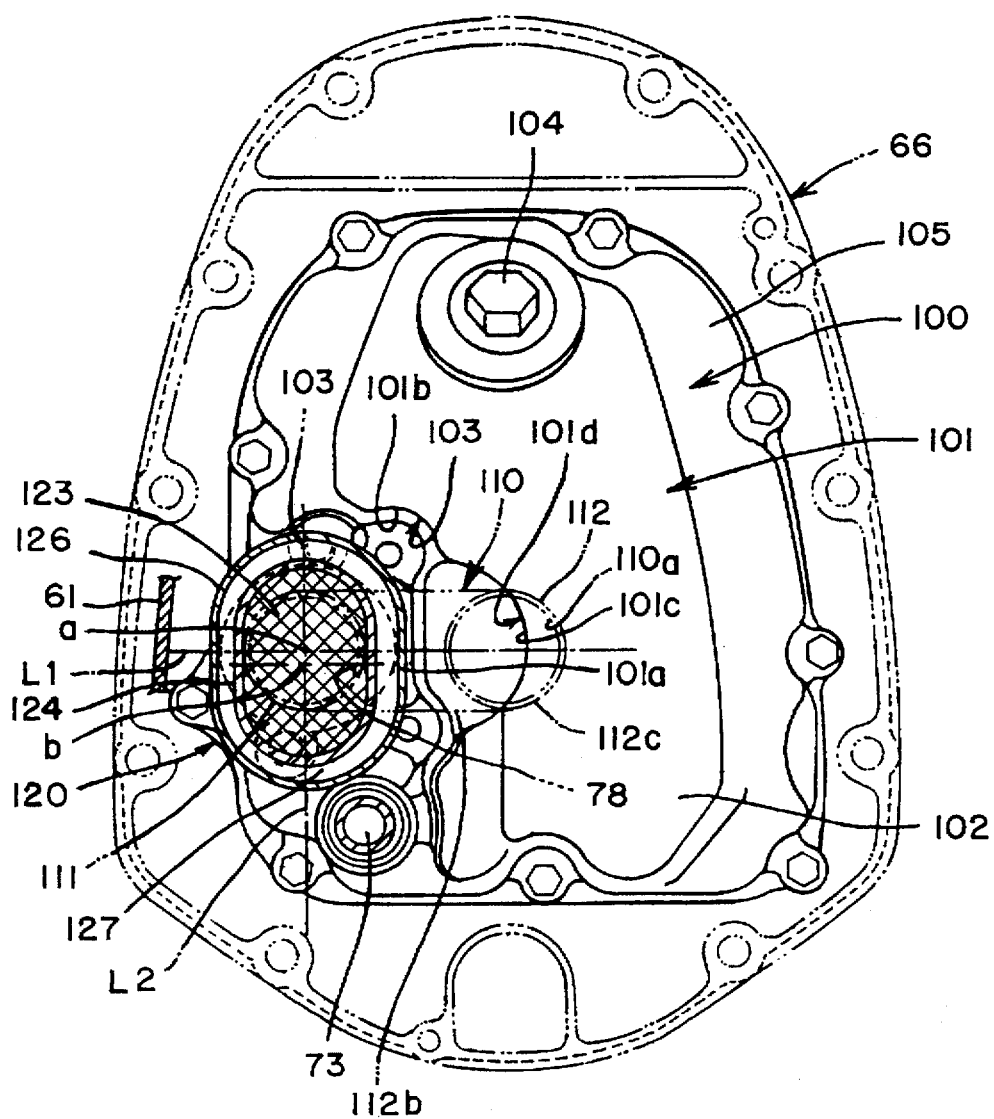
FIG. 6 is an explanatory bottom view in the direction of the arrow C of FIG. 5, showing the profile of an oil pan as viewed from the bottom and also the cross section of a vertical intermediate portion of a catalytic converter.

The longitudinal left side wall 101a of the oil holding portion 101 (facing toward the exhaust pipe 110 extending transversely in FIG. 6) is set off or recessed in the right-hand direction along its vertical portion extending from the top to the bottom 102. In addition, the transverse left side wall 101b is set off or recessed in the rearward direction (upward direction in FIG. 6), so that the longitudinal and transverse side walls 101a and 101b jointly form the aforesaid recessed portion 103 which has a generally L-shaped configuration as viewed from the bottom.

The generally L-shaped recessed portion 103 of the oil holding portion 101 extends obliquely and downwardly (or in the direction from the back to the face of the drawing sheet of FIG. 6) to clear the exhaust pipe 110 while keeping an appropriate spacing between the oil holding portion 101 of the oil pan 100 and the exhaust pipe 110. Those walls of the recessed portion 103 which are held in confrontation with the exhaust pipe 110 are constricted gradually toward the bottom 102 of the oil holding portion 101 of the oil pan 100.

In FIG. 6 reference character 104 denotes a drain bolt or tap 104 provided at a rear portion (an upper portion in the same figure) of the bottom 102 of the oil pan 100 for draining the oil. The mount seat designated by 105 is used to attach the oil pan 100 to the engine body. The mount seat 105 includes a flange portion in which the cooling-water delivery duct 73 and the exhaust duct 78 are formed.

Figure 7:
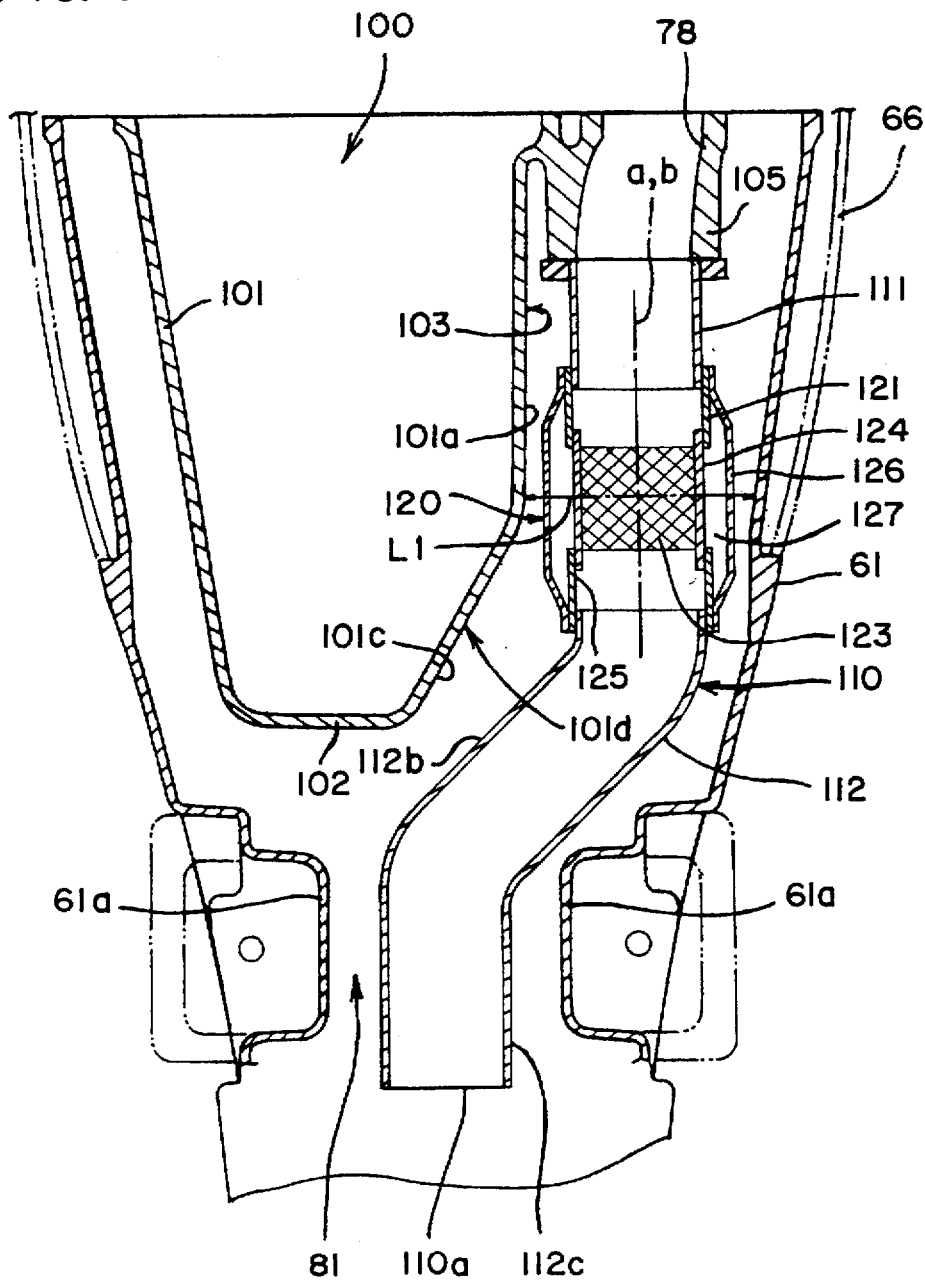
FIG. 7 is a cross-sectional view taken along the line D—D of FIG. 5, showing a portion of the oil pan and a portion of an exhaust pipe including the catalytic converter.

As shown in FIG. 7, the longitudinal side wall 101a of the oil holding portion 101, which is disposed in confrontation with the exhaust pipe 110, has a lower portion 101c beveled to reduce the width of the oil holding portion gradually in a direction toward the bottom 102. By virtue of the beveled lower wall portion 101c, the oil holding portion 101 further has a beveled portion 101d extending obliquely and downwardly and gradually retreating in the widthwise direction of the oil holding portion 101 substantially in conformity with the profile of a lower part 112 of the exhaust pipe 110 which is bent into a generally S shape.

The exhaust pipe 110 has a two-piece structure composed of an upper part consisting of an upper exhaust pipe 111 and the lower part 112 consisting of a lower exhaust pipe. The upper exhaust pipe 111 has an upper end attached by screws 113 (one being shown in FIG. 5) to the exhaust duct 78. The lower exhaust pipe 112 has a lower end forming the lower end opening 110a of the exhaust pipe 110 opening to the exhaust expansion chamber 81.

The exhaust pipe 110 of the foregoing construction defines therein an internal exhaust path in which the catalytic converter 120 is disposed for purifying the exhaust gas. The catalytic converter 120 has a body 123 of a known construction including a honeycomb structure of ceramics or metal carrying thereon oxidation catalysts or three-way catalysts.

Figure 8:
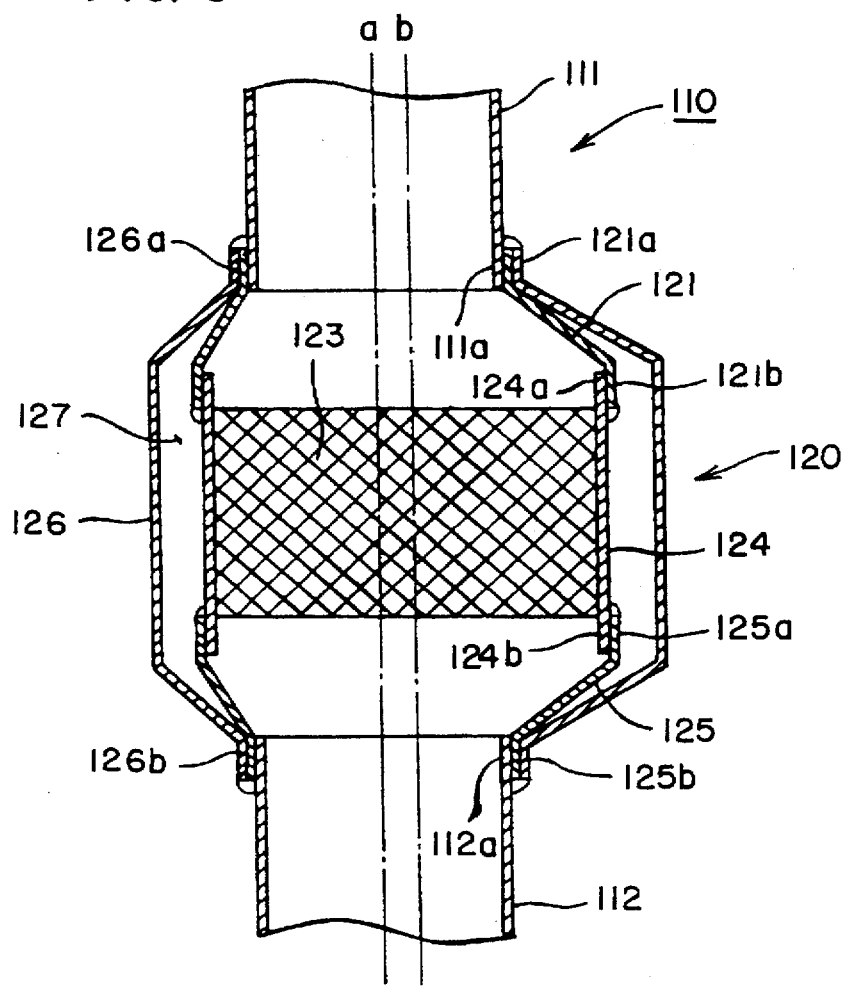
FIG. 8 is an enlarged longitudinal cross-sectional view of the catalytic converter.

As best shown in FIG. 8, the catalytic converter 120 further has a downwardly flaring funnel-like upper inner cover 121. The funnel-like upper inner cover 121 has an upper end 121a of a reduced diameter fitted around and welded to a lower end 111a of the upper exhaust pipe 111, and a lower end 121b of an enlarged diameter fitted around and welded to the upper end 124 of a tubular holder 124 forming a part of the catalytic converter body 124.

The catalytic converter 120 also has an upwardly flaring funnel-like lower inner cover 125. The funnel-like lower inner cover 125 has an upper end 125a of an enlarged diameter fitted around and welded to a lower end 124b of the tubular holder 124 of the catalytic converter body 123, and a lower end 125b of a reduced diameter fitted around and welded to an upper end 112a of the lower exhaust pipe 112.

As shown in FIG. 5, the catalytic converter 125 is downwardly spaced by an appropriate distance from an open end of the exhaust duct 78 in the flange portion and disposed between the upper exhaust pipe 111 and the lower exhaust pipe 112 to ensure that the screws 113 can be tightened and loosened without difficulty.

When the catalytic converter 120 is viewed from the side or the transverse direction of the outboard motor, such as shown in FIGS. 5 and 8, a central axis b of the catalytic converter body 123 is offset from a common central axis a of the upper and lower exhaust pipes 111, 112. On the other hand, when viewed from the longitudinal direction of the outboard motor, such as shown in FIG. 7, the central axis a of the exhaust pipes 111, 112 and the central axis b of the catalytic converter body 123 are in registry with each other. In this direction, welded portions between the upper inner cover 121 and the tubular holder 124 and welded portions between the tubular holder 124 of the lower inner cover 125 are substantially aligned in the vertical direction, as shown in FIG. 7.

Referring back to FIG. 8, the catalytic converter 120 further includes an outer cover 126 of a somewhat distorted tubular shape radially squeezed or constricted at its upper and lower ends 126a and 126b. The outer cover 126 is disposed exteriorly of the tubular holder 124 and the upper and lower inner covers 121, 125. The outer cover 126 has an upper end 126a fitted around the upper end 121a of the upper inner cover 121a and welded to the upper exhaust pipe 111 together with the welded portion between the upper inner cover 121 and the upper exhaust pipe 111, and a lower end 126b fitted around the lower end 125b of the lower inner cover 125 and welded to the lower exhaust pipe 112 together with the welded portion between the lower inner cover 125 and the lower exhaust pipe 112. With this arrangement, the catalytic converter 120 has a heat-insulating space 127 extending around the outside surface of the tubular holder 124 of the catalytic converter body 123.

As clearly shown in FIG. 6, the catalytic converter 120 has an elliptic or oblong shape in horizontal cross section which is larger in size in the longitudinal direction (vertical direction in FIG. 6) than in the transverse direction. More specifically,. the horizontal cross-sectional shape of the catalytic converter 120 is larger in size in a direction parallel to the longitudinally extending side wall 101a of the oil holding portion 101 of the oil pan 100, than in a direction parallel to the transversely extending side wall 101b of the oil holding portion 101. Stated in other words, the horizontal cross-sectional shape of the catalytic converter has a size larger in the longitudinal direction (lengthwise direction) of the outboard motor 1 than in the transverse direction (widthwise direction).

The longitudinal side wall 101a of the oil holding portion 101 and a confronted portion of the inside surface of the extension case 61 are spaced by a distance L1, as shown in FIG. 6. Similarly, the transverse side wall 101b of the oil holding portion 101 and a confronted portion of the inside surface of the extension case 61 are spaced by a distance L2, the distance L2 being greater than the distance L1.

According to the illustrated embodiment, the central axis b of the catalytic converter body 123 is, as shown in FIGS, 6 and 8, offset or displaced from the common central axis a of the upper and lower exhaust pipes 111, 112 in a direction toward the rear end of the outboard motor body. With this arrangement, the inner covers 121, 125, the holder 124, and the outer cover 126 are all offset or displaced rearward of the outboard motor body with respect to the common central axis a of the exhaust pipes 111, 112.

The exhaust pipe 110 is disposed vertically and substantially received in the generally L-shaped recessed portion 103 of the oil holding portion 101 of the oil pan 100, with the outer cover 126 of the catalytic converter 120 radially spaced from the longitudinally extending side wall 101a and the transversely extending side wall 101b of the recessed portion 103. The catalytic converter 120 is disposed in confrontation to the outside surface of the generally L-shaped recessed portion 103 which is oblique or beveled to accommodate the catalytic converter 120.

As shown in FIG. 7, the lower exhaust pipe 112 is bent in the widthwise direction of the outboard motor body so as to form a generally S shape distorted toward the beveled portion 101d formed by the beveled lower wall portion 101 of the oil holding portion 101. Thus, the lower exhaust pipe 112 extends downwardly from the catalytic converter 120 in such a manner as to draw the shape of an S which extends along the beveled portion 101d extending in the recessed portion 103 downward from a vertical intermediate portion of the oil pan 100 while keeping an appropriate spacing between the lower exhaust pipe 112 and the beveled portion 101d of the oil pan 100.

The generally S-shaped lower exhaust pipe 112 has an inclined portion 112b and a straight portion 112c contiguous to and extending vertically from a lower end of the inclined portion 112b. The vertically extending straight portion 112c is disposed between the center of the exhaust expansion chamber 61 and two confronting lateral recessed portions 61a, 61a provided in the extension case 61 for accommodating the lower mount 5a (FIG. 1). The upper and lower exhaust pipes 111, 112 and the catalytic converter 120 disposed in the extension case 61 are arranged to form a generally S-shaped configuration conforming to the profile of the extension case 61 as close as possible so that a portion of the internal space of the extension case 61 which is occupied by the exhaust pipe 110 including the catalytic converter 120 has no adverse effect on the performance of other peripheral components, such as the volume of the oil pan 100.

Thus, the exhaust pipe 110 including the catalytic converter 120 is disposed vertically along the generally L-shaped recessed portion 103 of the oil pan 100 while keeping a space between itself and the walls 101a, 101b and 101c (101d) of the recessed portion 103. Even though the outside diameter of the catalytic converter 120 is greater than the outside diameter of the upper and lower exhaust pipes 111, 112, the exhaust pipe 110 can be received in the recessed portion 103 of the oil holding portion 101.

In order to obtain a higher exhaust-gas purifying efficiency of a catalytic converter, the diameter and length of the catalytic converter can be increased. However, for a catalytic converter having a circular cross-sectional shape, if the axial extent or length (length of an exhaust passage) of the same catalytic converter is set to an ordinary size, the necessary diameter of the circular catalytic converter becomes too large for the extension case 61 having spatial limitations.

According to the present invention, however, since the overall configuration of the catalytic converter 120 including the catalytic converter body 123 is an elliptic or oblong shape having a major axis (length) and a minor axis (breadth), as shown in FIG. 6, the catalytic converter 120 can possess a relatively large cross-sectional area to insure highly efficient exhaust gas purifying operation and also can be placed on the side of the oil pan 100 while keeping an appropriate spacing between itself and the oil pan 100.

Furthermore, by virtue of the heat insulation space 127 defined between the outer cover 126 and the inner covers 121, 125 and tubular holder 124, the catalysts in the catalytic converter 120 are able to accomplish a desired catalytic effect even when they are subjected to low temperatures under the effect of the engine cooling water. The catalytic converter 120 which is disposed below the mount seat 105 can be enlarged in size and capacity within a limited range which is defined in the longitudinal direction of the outboard motor by and between the mount seat 105 and the lower mount 5a. This range is greater in the longitudinal direction of the outboard motor than in the vertical direction.

Thus, in the outboard motor 1 having dimensional and spatial limitations in longitudinal and transverse directions, and particularly in the transverse (widthwise) direction, the catalytic converter 120 having a sufficient capacity for purifying the exhaust gas can be disposed on a side of the oil pan 100 without exerting influence on peripheral devices and components of the outboard motor 1.

It is further preferable for the exhaust emission control system (exhaust gas purifying system) of the outboard motor that the fresh air is supplied to an exhaust path or line containing the catalytic converter 120 of the foregoing construction.

To deal with this, the present invention further provides the fresh-air delivery system 20 disposed in an internal space defined between the engine cover 12 and the under case 14. The fresh-air delivery system 20 is an essential part of this invention and constitutes a secondary air supply mechanism or unit for supplying fresh air to the catalytic converter 120.

Figure 9:
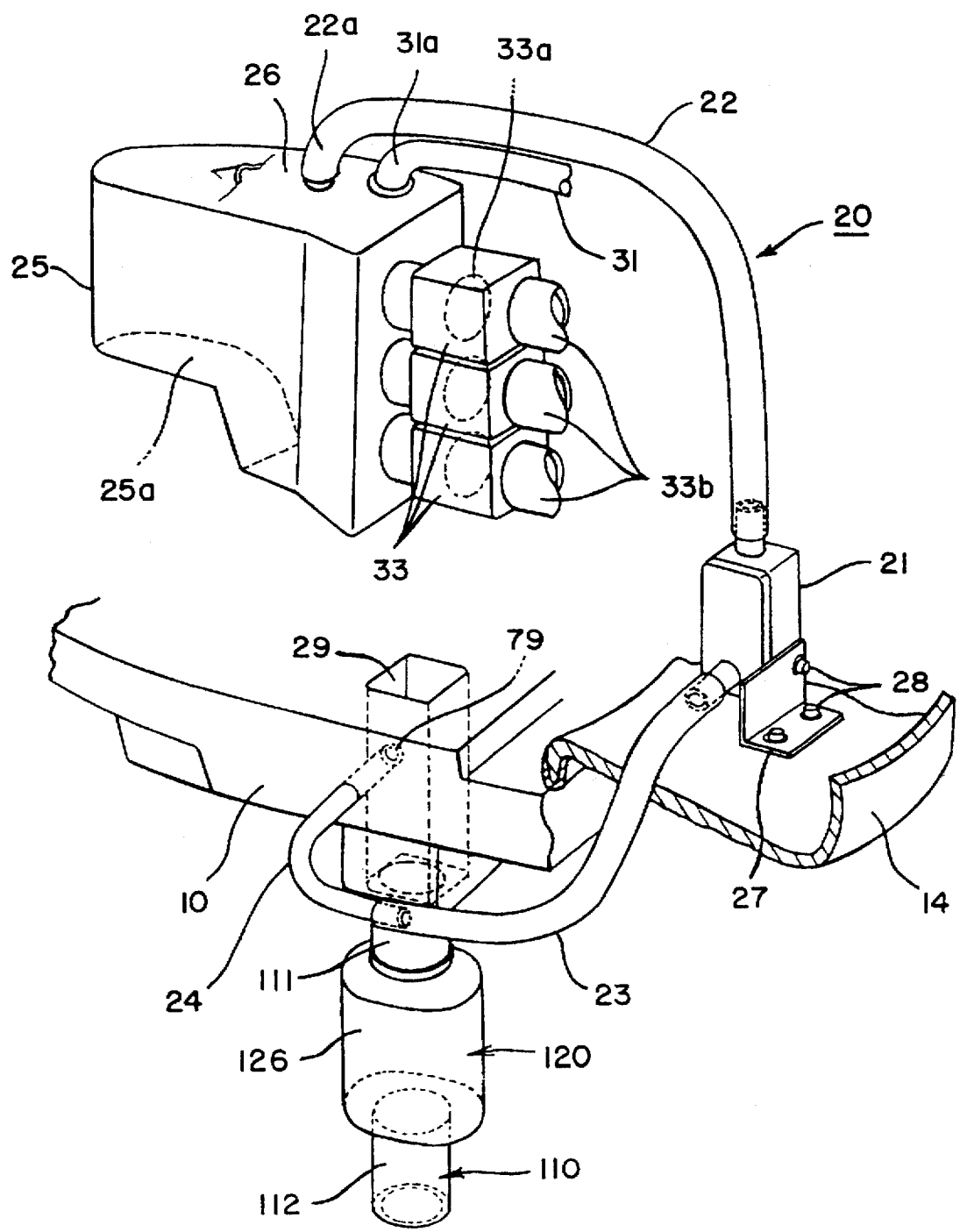
FIG. 9 is a diagrammatical perspective view showing a fresh-air delivery system of the outboard motor according to the present invention.

As shown in FIG. 9, the fresh-air delivery system 20 includes the check valve 21, the primary tube 22 made of heat-resting rubber and serving as a conduit connected to an inlet side of the check valve 21, and the secondary tube 23 made of heat-resting rubber and connected to an outlet side of the check valve 21. The check valve 21 is composed of a valve body of stainless steel, and a valve box of aluminum alloy.

The secondary tube 23 penetrates the under case 14 in the vertical direction and is connected to one end of a connecting pipe 24. The connecting pipe 24 is made of metal and preferably stainless steel and bent at right angles in a horizontal plane. The opposite end of the connecting pipe 24 is implanted in the side wall of the mount case 10. The primary tube 22, the secondary tube 23 and the connecting pipe 24 jointly form a conduit means defining a fresh-air delivery path or line.

The check valve 21 is attached by screws 28 to the under case 14 via a bracket 27. The secondary tube 23 has one end connected to the outlet side of the check valve 21 and is held in fluid communication with the exhaust duct 29 via the connecting pipe 24 so that the fresh air can be supplied into the exhaust passage. The exhaust duct 29 extends vertically through the mount case 10 and is rectangular in cross section.

Figure 10:
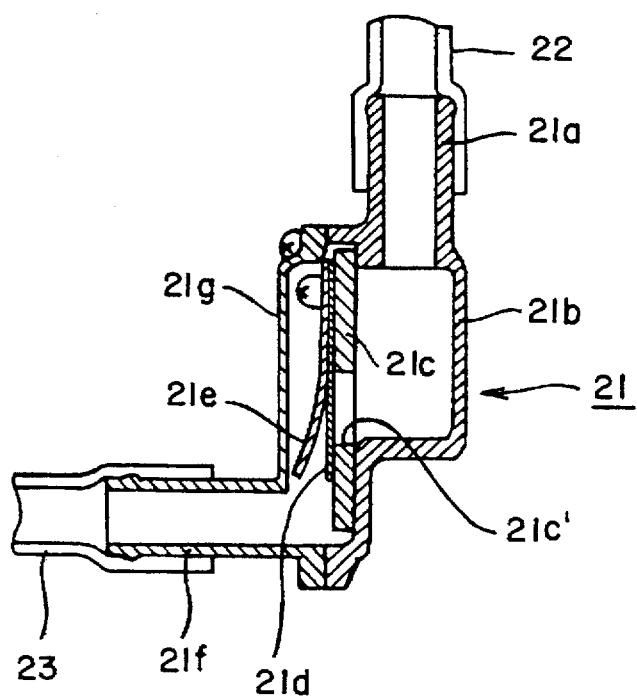
FIG. 10 is a detailed cross-sectional view of a check valve of the fresh-air delivery system.

The intake silencer 25 serving as an intake box is disposed on one side (back side in FIG. 1) of the engine 11. The primary tube 22 of the fresh-air delivery system 20 has an upstream end 22a connected to the top plate 26 of the intake silencer 25. The intake silencer 25 further has an intake opening 25a facing at a front end portion of the underside of the intake silencer 25. The intake silencer 25 is in the form of an elongated rectangular box and so constructed as to conform to the structure of the engine 11 which is composed of an in-line three-cylinder engine. The top plate 26 of the intake silencer 25 also retains one end 31a of the breezer tube 31 together with the end 22a of the primary tube 22. The intake silencer 25 supports on its rear surface a plurality (three in the illustrated embodiment) of carburetors 33 constituting a fuel supply device or unit. Each of the carburetors 33 has one throttle valve 33a movably disposed therein. Since the engine 11 used in the illustrated embodiment is an in-line three-cylinder engine, the carburetors 33 are aligned vertically in conformity with the vertically aligned intake manifolds 33 of the respective cylinders. FIG. 10 illustrates a detailed internal structure of the check valve 21. The check valve 21 is composed of a valve case 21b made of aluminum alloy and having an inlet 21a, a plate member 21c screwed to the valve case 21b and having a valve hole or opening 21c', a reed valve body 21d of stainless steel for opening and closing the valve opening 21c', a stop plate 21e for limiting the movement of the reed valve body 21d in the valve opening direction, and a lid 21g attached to the valve case 21b and having an outlet 21f.

In operation of the check valve 21, when the pressure at the outlet 21f is below the pressure at the inlet 21a, the reed valve body 21d is set in the valve-opening condition or state in which the valve opening 21c' is open within a predetermined range variable according to the position of the stop plate 21e. Conversely when the pressure of the outlet 21f exceeds the pressure at the inlet 21a, the reed valve body 21d is set in the valve-closing condition or state in which the valve opening 21c' is closed as shown in FIG. 10.

Referring back to FIG. 9, the mount case 10 further has a fresh-air intake hole 79 by means of which the downstream open end of the connecting pipe 24 connected to the secondary tube 23 is communicated with the exhaust duct 29. With this arrangement, the fresh air (outside air) introduced from the intake opening 25a of the intake silencer 25 is supplied to the exhaust duct 29 in the mount case 10 successively through the intake silencer 25, the primary tube 22, the check valve 21, the secondary tube 23, and the connecting pipe 24.

The fresh air supplied to the exhaust duct 29 is introduced into the exhaust gas containing unburned fuel components such as HC and other components such as CO discharged from the engine 11, and after been mixed with the exhaust gas, the air is further introduced into the exhaust pipe 110 and thence to the catalytic converter 120 in which air is burned to remove harmful components, such as HC and CO from the exhaust gas. The thus purified exhaust gas is subsequently discharged into the exhaust expansion chamber 81.

Now, operation of the fresh-air delivery system 20 will be described below. Like the conventional apparatus previously described, the outboard motor 1 may also form a vacuum in its exhaust system either at the start of, or during the operation of, the outboard motor 1.

In FIG. 5 when the exhaust system forms a vacuum, the pressure in the exhaust duct 29 is less than the atmospheric pressure whereupon the secondary tube 23 forms a vacuum or suction tending to open the check valve 21. In other words, the pressure at the outlet 21f of the check valve 21 is less than the pressure at the inlet 21a shown in FIG. 10, and so the reed valve body 21d is displaced in a direction to open the valve opening 21c' to such an extent proportional to the pressure difference created between the inlet 21a and outlet 21f. Thus, the fresh air is allowed to flow from the primary tube 22 into to the secondary tube 23 through the check valve 21.

The fresh air having passed through the intake silencer 25, the primary tube 22, the check valve 21, and the secondary tube 23 of the fresh-air delivery system 20 shown in FIG. 9 is, thereafter, drawn into the exhaust duct 29 whereupon the vacuum or negative pressure in the exhaust duct 29 is canceled out or vanished. The pressure in the exhaust duct 29 is now in equal to the atmospheric pressure, so that water existing below the exhaust pipe 110 cannot enter the exhaust pipe 110 through the lower end opening 110a.

It may occur that water flows into the housing of the outboard motor 1 through the air intake port 13 at an upper end of the engine cover 12. In this instance, however, since the air intake opening 25a in the intake silencer 25 is facing downwards, and since the fresh air is drawn into the primary tube 22 located at a position above the top plate 26 of the intake silencer 25, the water is no longer possible to enter the primary tube 22.

Furthermore, by the use of the primary and secondary tubes 22 and 23 both made of heat-insulating rubber, the check valve 21 and more particularly the reed valve body 21d are substantially isolated from the influence of heat. The check valve 21 can be readily set on any desired position by changing the respective lengths of the primary and secondary tubes 22, 23. Thus, in the case where the check valve 21 should be kept free from the influence of heat emitted from the engine 11, the check valve 21 is located at a position far distant from high temperature portions of the engine 11.

Now, operation of the breezer tube 31 will be described with reference to FIG. 3. The breezer tube 31 is connected at one end to the head cover 35 and, at the other end, to the intake silencer 25.

While the engine 11 is running, uncombusted fuel gas leaks from the combustion chamber 43 through slide metals or bearings of the intake and exhaust valves 42, 44 and is collected in an internal space of the head cover 35. The uncombusted fuel gas thus collected is then guided into the intake silencer 25 through the breezer tube 31 with the result that the uncombusted fuel components are removed before the exhaust gas is finally discharged into the atmospheric air. Since the breezer tube 31 is connected to the top plate 26 of the intake silencer 25 as shown in FIG. 9, there is no chance for water to move into the head cover 35 through the breezer tube 31.

The fresh-air delivery system 20 is connected to the exhaust line via the intake silencer 25 and hence able to supply fresh air to each carburetor 33 successively through the primary tube 22, the check valve 21 and the secondary tube 23. Since the fresh-air intake opening is provided at an upper part including the engine 11 of the outboard motor 1, the penetrating water has no chance to mix with the fresh air even when the outboard motor 1 is used in a watery or full-of-water environment.

Furthermore, the check valve 21 is adapted to be opened and closed according to a pressure difference created in the exhaust system, so that a vacuum formed at an engine stall can be automatically canceled out, and the water hammer resulting from the engine stall can be lightened effectively.

The fresh-air delivery system 20 composed of the intake silencer 25, the primary tube 22, the check valve 21, the secondary tube 23 and the connecting pipe 24 is supported by the firmly secured mount case 10 and the fixed intake silencer 25. With this supporting structure, the fresh-air delivery system 20 can be installed with highly efficient use of the internal space of the under case 14.

The check valve 21 disposed in the fresh-air delivery path or line is operative to supply the fresh air to the exhaust path or line as long as a vacuum is formed in the exhaust path, and to block or suspend supply of fresh air to the exhaust path when the vacuum in the exhaust path disappears. By virtue of the check valve 21, the fresh air is be supplied to the exhaust line only when purification of the exhaust gas is necessary.

Since the fresh air drawn into the exhaust line including the exhaust emission control catalytic converter 120 is taken up from the intake silencer 25, intake noise level can be reduced to a considerable extent.

The catalytic converter 120 disposed in the exhaust system is supplied with fresh air introduced from an upstream side of the catalytic converter 120 together with the exhaust gas. The exhaust gas is mixed up with the fresh air, and so uncombusted components in the exhaust gas can be combusted in the catalytic converter 120 with high efficiency. As a result, the exhaust gas emitted from the outboard motor 1 of the present invention is highly clean and harmless as compared to the exhaust gases discharged from the conventional outboard motors.

In spite of various spatial and dimensional limitations on the housing including the engine cover 12, the under cover 14, the extension case 61 and the under cover 66, the catalytic converter 120 having a large capacity capable of insuring a high exhaust gas purifying effect can be disposed in juxtaposition to the oil pan 100. The fresh-air delivery system 20 can be placed in the housing without affecting the peripheral devices and is also able to introduce the fresh air into the exhaust system at an optimum timing with substantial reductions in intake noise.

The fresh-air delivery system 20 of the present invention further has a function to supply fresh air to the exhaust system for canceling out a vacuum in the exhaust system, thereby precluding the occurrence of water hammer. Accordingly, even when a small hole is formed in the exhaust pipe, water is prevented from entering the exhaust passage through the small hole with the result that the exhaust passage is completely free from the influence of water.

As described above, according to a first aspect of the present invention, an exhaust emission control catalytic converter is disposed vertically in juxtaposition to a side wall of the oil holding portion of an oil pan disposed beneath an engine of the outboard motor. Even though a housing such as a case of the outboard motor is constricted in the widthwise direction in view of the structure or mechanism used for attaching a body of the outboard motor to the hull, the catalytic converter having a sufficient capacity for purification of the exhaust gas is disposed in the housing without affecting the peripheral components and devices while keeping an adequate space between the catalytic converter and the oil holding portion and maintaining the necessary volume of the oil pan. This arrangement is particularly advantageous when embodied in an outboard motor having a multicylinder four-stroke engine with cylinders disposed horizontally and a crankshaft disposed vertically, and equipped with an exhaust emission control system. Furthermore, the catalytic converter arranged in the manner described above is able to increase the space factor of the housing even though the housing has various limitations on outside dimensions or size due to the peculiarity of the outboard motor. The outboard motor having such catalytic converter is practically useful, accordingly.

The oil holding portion of the oil pan suspended from a lower end of the engine has a recessed portion or space defined by a transverse side wall and a longitudinal side wall. The thus formed recessed portion is used for receiving therein the catalytic converter. The catalytic converter preferably has an elliptic or oblong shape in horizontal cross section. This arrangement makes it possible to install, within the housing of the outboard motor, the catalytic converter of an enlarged capacity even though the housing has dimensional and spatial limitations which are stricter in the widthwise direction than in the longitudinal direction. The recessed portion in the oil pan used in combination of the oblong catalytic converter is able to provide a substantial reduction in width of the housing concurrently with a substantial enlargement in cross-sectional area of the catalytic converter bringing about an enhanced exhaust emission controlling effect (exhaust gas purifying effect).

By virtue of the oblong shape, the catalytic converter is able to increase its cross-sectional area without increasing the vertical size (height). The oblong catalytic converter is compact as a whole but still can provide an improved performance characteristic.

According to another aspect of the present invention, there is provided an outboard motor having a catalytic converter, and a fresh-air delivery system for introducing fresh air into an exhaust emission control system (exhaust gas purification system) including the catalytic converter so as to improve the exhaust gas purifying effect of the exhaust emission control system.

More particularly, the fresh-air delivery system is disposed close to the engine body while keeping a particular relationship between itself and an under case such that the fresh-air delivery system can be arranged and supported in a simple manner by using the components constituting a part of the housing.

The fresh-air delivery system has an intake opening used in common with an intake silencer provided for introducing air into a fuel supply unit of the engine. Accordingly, there is no need of providing a separate intake opening. Since the fresh air is introduced from the intake silencer, intake noise emitted in connection with the intake stroke or process can be attenuated effectively. Thus, the fresh-air delivery system operates silently.

The fresh-air delivery system of this invention includes a check valve disposed in a fresh-air delivery path or line. By virtue of operation of the check valve, the fresh air can be introduced into the exhaust system at an optimum timing only when purification of the exhaust gas is necessary. The check valve is supported by a mount case used mainly for supporting the engine. Accordingly, there is no need of providing a separate support member for the check valve. The foregoing valve supporting structure is extremely simple in construction.

Furthermore, since the fresh-air delivery system is connected to the exhaust system via the intake silencer supplying air to a carburetor (fuel supply unit) of the engine, and a conduit means including the check valve, the intake opening is provided at an upper portion of the outboard motor including the engine. This arrangement is particularly advantageous in that water is no longer possible to adhere to the fresh air while being supplied for purification of the exhaust gas even when the outboard motor is used in a watery or full-of-water environment.

According to the present invention, irrespective of various restrictions imposed by the housing including the engine case, the extension case, and the under cover, the catalytic converter having a large capacity and hence capable of providing an enhanced exhaust gas purifying effect can be disposed in juxtaposition to the oil pan. In addition, the fresh-air delivery system is disposed in the housing without affecting the peripheral components and can operate to introduce the fresh air into the exhaust system at an optimum timing with substantial reduction in intake noise. The fresh-air delivery system is also capable of performing a fresh-air supplying operation to cancel out a vacuum in the exhaust system and hence eliminate the water hammer. Accordingly, even when a small hole or opening is formed in the exhaust pipe, water is prevented from entering the exhaust passage through the small hole with the result that the exhaust passage is completely free from water.

Yet, the exhaust emission control catalytic converter having an elliptic or oblong shape in horizontal cross section is greatly contributive to optimization of catalysts used for the outboard motor having various limitations on the outside dimensions or size, and provision of an exhaust emission control system (exhaust gas purification system) including the catalytic converter concurrently with optimization of the arrangement of the fresh-air delivery system.

As is apparent from the foregoing description, the outboard motor constructed in accordance with this invention is provided with an exhaust emission control system (exhaust gas purification system) which has never been realized by the prior art due various strict limitations on the outside shape of the outboard motor.

Obviously, various minor changes and modifications of the present invention are possible in the light of the above teaching. It is therefore to be understood that within the scope of the appended claims the invention may be practiced otherwise than as specifically described.

What is claimed is:

1. An outboard motor comprising:

an outboard motor body having a swivel case and a swivel shaft and adapted to be attached to a bracket on the hull of a water vessel via said swivel case and said swivel shaft such that said outboard motor body is pivotally movable in both vertical and horizontal planes;

an engine disposed at an upper part of said outboard motor body and including an oil pan disposed beneath said engine, said oil pan including an oil reservoir having a wall portion extending in a vertical direction;

a propeller disposed at a lower part of said outboard motor body and driven by said engine;

an exhaust pipe held in fluid communication with said engine and disposed vertically along said wall portion of said oil reservoir;

a catalytic converter disposed in said exhaust pipe at an intermediate portion of the same, said catalytic converter being confronted with said wall portion of said oil reservoir with a space provided therebetween, said catalytic converter having a shape in horizontal cross section configured such that the size of said shape in horizontal cross section is greater in a first direction than in a second direction perpendicular to said first direction; and wherein said oil reservoir of said oil pan has a lower portion beveled in the widthwise direction of said outboard motor, and said exhaust pipe has a lower portion bent into a generally S-shaped configuration to conform to the profile of said beveled lower portion of said oil reservoir.

2. An outboard motor according to claim 1, wherein said oil reservoir of said oil pan has a recessed portion having a generally L-shaped configuration as viewed from the bottom, said L-shaped recessed portion being composed of a first wall part of said oil reservoir extending substantially parallel to said first direction, and a second wall part of said oil reservoir extending substantially parallel to said second direction, said first part being greater in size than said second part.

3. An outboard motor according to claim 2, wherein said catalytic converter is disposed in said L-shaped recessed portion.

4. An outboard motor according to claim 1, wherein said catalytic converter disposed on one side of said oil pan, the size of said shape in horizontal cross section of said catalytic converter being greater in the longitudinal direction of said outboard motor than in the widthwise direction of said outboard motor.

5. An outboard motor according to claim 4, wherein said shape in horizontal cross section of said catalytic converter is an elliptic shape or an oblong shape resembling a running track including straight sides along its major axis.

6. An outboard motor comprising:

an outboard motor body having a swivel case and a swivel shaft and adapted to be attached to a bracket on the hull of a water vessel via said swivel case and said swivel shaft such that said outboard motor body is pivotally movable in both vertical and horizontal planes;

an engine disposed at an upper part of said outboard motor body and including an oil pan disposed beneath said engine, said oil pan including an oil reservoir having a wall portion extending in the vertical direction;

a propeller disposed at a lower part of said outboard motor body and driven by said engine;

an exhaust pipe held in fluid communication with said engine and disposed vertically along said wall portion of said oil reservoir;

a catalytic converter disposed in said exhaust pipe at an intermediate portion of the same, said catalytic converter being confronted with said wall portion of said oil reservoir with a space provided therebetween, said catalytic converter having a shape in horizontal cross section configured such that the size of said shape in horizontal cross section is greater in a first direction than in a second direction perpendicular to said first direction;

a fresh-air delivery system for introducing fresh air into said exhaust pipe; and wherein said fresh-air delivery system has an intake opening, said intake opening being composed of an intake silencer disposed upstream of a fuel supply unit of said engine.

7. An outboard motor according to claim 6, wherein said fresh-air delivery system is disposed in an internal space defined between an engine cover and an under case, said engine being also disposed in said internal space and closed by said engine cover and said under case.

8. An outboard motor according to claim 6, wherein said fresh-air delivery system is composed of a first conduit connected at one end to said intake silencer, a check valve having an inlet side connected to the other end of said first conduit and also having an outlet side, a second conduit connected at one end to said outlet side of said check valve and, at the other end, to an exhaust passage held in fluid communication with said exhaust pipe.

9. An outboard motor according to claim 8, wherein said exhaust passage is formed in a mount case on which said engine is supported.

10. An outboard motor according to claim 8, wherein said check valve is disposed on a mount case on which said engine is supported.

11. An outboard motor according to claim 8, wherein said check valve is composed of a valve case having an inlet, a plate member attached to said valve case and having a valve opening, a reed valve body associated with said plate member for opening and closing said valve opening, and a lid attached to said valve case and having an outlet.

12. An outboard motor according to claim 11, wherein said check valve is operative to open said valve opening by said reed valve body when the pressure at said outlet is less than the pressure at said inlet, and to close said valve opening by said reed valve body when the pressure at said outlet is greater than the pressure at said inlet.

13. An outboard motor according to claim 6, wherein said oil reservoir of said oil pan has a recessed portion having a generally L-shaped configuration as viewed from the bottom of said oil reservoir, said L-shaped recessed portion being composed of a first part extending substantially parallel to said first direction, and a second part extending substantially parallel to said second direction, said first part being greater in size than said second part.

14. An outboard motor according to claim 13, wherein said catalytic converter is disposed in said L-shaped recessed portion.

15. An outboard motor according to claim 6, wherein said catalytic converter disposed on one side of said oil pan, the size of said shape in horizontal cross section of said catalytic converter being greater in the longitudinal direction of said outboard motor than in the widthwise direction of said outboard motor.

16. An outboard motor according to claim 15, wherein said shape in horizontal cross section of said catalytic converter is an elliptic shape or an oblong shape resembling a running track including straight sides along its major axis.

17. An outboard motor comprising:

an outboard motor body adapted to be attached to a stern of the hull of a water vessel and pivotally movable in both vertical and horizontal planes, said outboard motor body having an exhaust opening;

an engine mounted on said outboard motor body and having a combustion chamber held in fluid communication with said exhaust opening via an exhaust duct for discharging exhaust gas from said exhaust opening;

a fresh-air delivery passage having one end connected to said exhaust duct for introducing fresh air into said exhaust duct;

an intake box disposed upstream of an intake duct of said engine and connected to the other end of said fresh-air delivery passage; and a check valve disposed in an intermediate portion of said fresh-air delivery passage and adapted to be opened only when the pressure in said exhaust duct is less than the atmospheric pressure, wherein at least a part of a longitudinal portion of said fresh-air delivery passage extending between said check valve and said exhaust duct has a thermally insulated structure.

18. An outboard motor according to claim 17, wherein said thermally insulated structure is composed of a heat-insulating tube.

19. An outboard motor according to claim 18, wherein at least a part of said fresh-air delivery passage has a cooled structure.

20. An outboard motor according to claim 19, wherein said cooled structure is composed of a metal tube.

21. An outboard motor according to claim 20, wherein said other end of said fresh-air delivery passage is connected to a side of said intake box excluding the underside of said intake box.

22. An outboard motor according to claim 19, wherein said other end of said fresh-air delivery passage is connected to a side of said intake box excluding the underside of said intake box.

23. An outboard motor according to claim 18, wherein said other end of said fresh-air delivery passage is connected to a side of said intake box excluding the underside of said intake box.

24. An outboard motor according to claim 17, wherein said other end of said fresh-air delivery passage is connected to a side of said intake box excluding the underside of said intake box.

25. An outboard motor comprising:

an outboard motor body;

a water-cooled engine disposed in said outboard motor body and having a plurality of combustion chambers;

an exhaust passage composed of a confluent point at which streams of exhaust gases leaving the respective combustion chambers are blended together, an exhaust expansion chamber defined in said outboard motor body, and an exhaust pipe disposed in said exhaust expansion chamber and having a lower open end from which the exhaust gases are discharged;

a fresh-air delivery passage having one end connected to said exhaust passage at a position downstream of said confluent point and upstream of said exhaust pipe, the other end of said fresh-air delivery passage being connected to an intake box; and a cooling water passage arranged for cooling said engine with cooling water flowing through said cooling water passage, said cooling water passage having an outlet located at a higher position than said lower open end of said exhaust pipe and opening to said exhaust expansion chamber, and a drain opening formed in a gasket attached to the under surface of a mount case on which said engine is supported, said drain opening and said outlet being arranged such that the cooling water is drawn off from said outlet into said expansion chamber via said drain opening.

* * * * *